No. 25,016. PATENTED AUG. 9, 1859.
S. HOGA, W. P. PIGGOTT & S. BEARDMORE.
MODE OF GENERATING AND APPLYING ELECTRIC CURRENTS
IN TELEGRAPHING.

Witnesses
John T. Potinau
T. P. Capp

Inventors.
Stanislas Hoga
William Peter Piggott
Septimus Beardmore

UNITED STATES PATENT OFFICE.

S. HOGA, W. P. PIGGOTT, AND S. BEARDMORE, OF THE COUNTY OF MIDDLESEX, ENGLAND.

IMPROVED MODE OF GENERATING AND APPLYING ELECTRIC CURRENTS IN TELEGRAPHING.

Specification forming part of Letters Patent No. 25,016, dated August 9, 1859.

*To all whom it may concern:*

Be it known that we, STANISLAS HOGA, gentleman, WILLIAM PETER PIGGOTT, electrician, and SEPTIMUS BEARDMORE, civil engineer, all of the county of Middlesex, in that part of the United Kingdom of Great Britain and Ireland called "England," have invented a new and Improved Mode of Producing, Using, and Transmitting Electric Currents for Telegraph Purposes; and we do hereby declare that the following is a full and exact description thereof, reference being had to the accompanying drawings hereto annexed and made part of this specification, in which—

Figure 1:
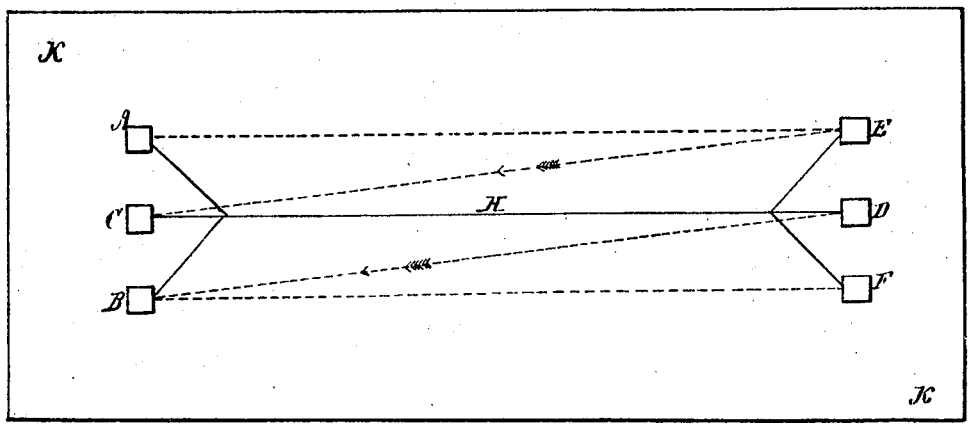

Figure 1 presents a simple arrangement for producing the currents. K K shows a plan of the earth or natural body of water A D, in which are placed plates of zinc or other positive metals; B E, plates of iron or other metal which is negative to zinc, but positive to C F, plates of platinum or other metal which is also negative to A D. H is the conducting-wire, which, when connecting A or C at one end with E at the other, or D or D or F at one end with B at the other, produces the currents required.

Figure 2:
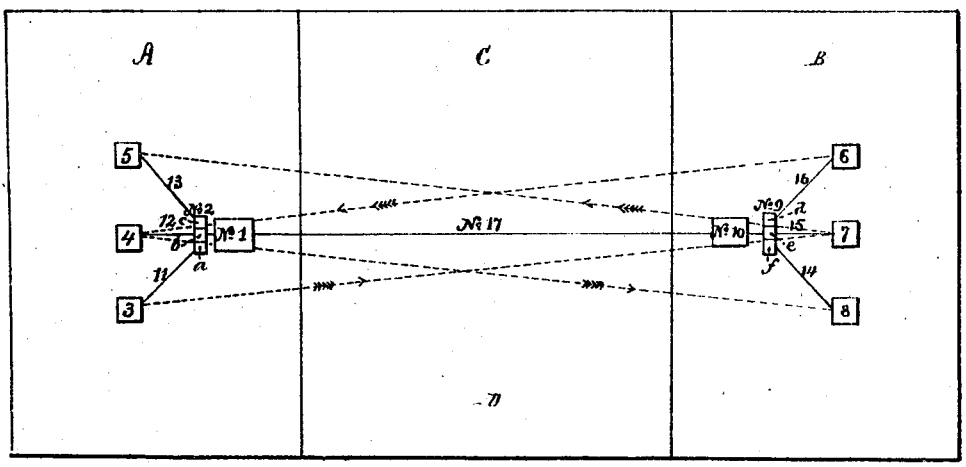

Fig. 2 exhibits more particularly the mode of working an electric-telegraph instrument. A B may be supposed to be land on either side of C, D representing water. Nos. 1 and 10 represent telegraphic instruments or simple galvanometers at each station; 2 and 9, levers or handles, each insulated in two separate places; 3, zinc or other positive metal placed near No. 1; 4, iron or other metal negative to No. 3, but positive to No. 5, representing platinum or other metal negative to both the others. Nos. 6 7 8 represent similar metals as Nos. 3, 4, and 5, and are placed in a similar manner near No. 2, 6 being zinc, 7 iron, and 8 platinum. Nos. 11, 12, and 13 are wires connecting 3, 4, and 5 with the handle No. 2, and 14, 15, and 16 connect 6, 7, and 8 with the handle No. 9. 17 represents the conducting-wire, insulated at either end.

The current of electricity operating on telegraphs has been hitherto generated at either end of the line by means of local batteries, made by placing the negative and positive elements in juxtaposition in a cell or cells, and transmitted over the line-wire, returning by the earth, while the reverse current is obtained by changing the poles of the local batteries.

Our improvement, which for the purpose of designation is termed the "globe-telegraph," consists in creating the current in the manner hereinafter described, and in transmitting it directly through and by means of the earth or natural body of water, using the line-wire only for the return-current.

To obtain the current we place in the earth, or in a natural body of water near each of the stations for communication, in the form of plates, the three substances 3, 4, and 5, possessing the relations to each other as above mentioned. These metals or substances are not connected with each other, but can be connected with the insulated wire or wires H, Fig. 1, or No. 17, Fig. 2, transmitting the return-current. By the alternate action of the zinc and platinum or similar positive and negative substances at one station with the iron or similar substance at the other the required current is obtained, and with it the signals are effected. It is to be observed here that although iron is considered by the best authorities to be negative to zinc, yet we have found it, when much oxidized, to be positive in relation to that metal.

We consider a very important part of the invention to be the adjustment and size of the plate-surface to the distance of transmission. This is regulated by the following rule: Having ascertained the size or amount of plate-surface required to work an instrument at a given distance, the same instrument can be operated at any other distance by increasing or diminishing the amount of surface in proportion to the square root of the distance. Thus, if two square feet of zinc at one end of an insulated conducting-wire fifty miles long, at the other end of which is a piece of platinum of the same size, produces sufficient electro-motive force to work the instrument, then four square feet of the same metals, similarly placed two hundred miles distance, will produce the same effect.

The mode of operating the globe-telegraph may be described as follows: If by a conventional arrangement the parts *b c* of the handles 2 and 9, Fig. 2, are placed in contact, the one or the other with the instruments 1 or 10, the operator at B will, in order to operate on the instruments, break contact with *d* and instrument No. 10. A current will thereby flow from 6 through the earth to 4, and thence through instrument No. 1, by the wire, back to 6. Then, in order to produce a reverse current, the sender at B will place *f* (handle No. 9) in contact with the instrument No. 10, and the current will then flow from 4 through the earth to 8, and back through No. 10, by the wire, to 4; or, vice versa, the operator at A will break contact with *a*, (handle No. 2,) and thereby cause the current to flow from No. 3 through the earth to No. 7, which, when at rest, is in contact with instrument No. 10. To obtain a reverse current he will break contact with C, (handle No. 2,) and thereby cause the current to flow from No. 7 through the earth to No. 5, the current returning along the wire to No. 7.

The plates may be placed in separate porous cells, and, if it be necessary to have a large amount of surface, several plates of the same metal can be used in the same or separate cells, and be connected by a wire, so as to operate as one plate. To facilitate the generation of the current the usual mode of chemically exciting these metals may be employed.

When a large amount of electric force, or what is understood by the word "tension," is required, two, three, or more insulated wires may be used, electric action being caused along each by means of the separate dissimilar metals, as above described, while the increased force on the instrument is obtained by connecting such two or more wires with two or more coils round the same helix, but unconnected with each other.

When a printing-instrument like Morse's, Siemens', or Hughes's is used, requiring only a current in one direction for the purpose either of forming a temporary magnet or altering the condition of the magnetism in a permanent one already attached to the instrument, we need only apply so much of our arrangement as will be necessary to generate the current only in one direction from the positive to the negative substance through the earth, and using this when necessary to set a local battery at work, by which to act on the instrument.

The production of electric currents by means of positive and negative substances placed in the earth, or in natural bodies of water connected together by an insulated wire, has been suggested and described by Alexander Bain in the specification to his English Letters Patent dated May 27, 1843; but his manner of applying the suggestion to telegraphic purposes failed to lead to any practical or useful result, and was abandoned. Our mode of arrangement is an improvement upon his, inasmuch as he expected to obtain the current but in one direction, while we are able, as above described, to obtain currents not only in one but in either direction, and by the discovery of the proportion the plate-surface should bear to the space through which the current is to pass we are enabled to construct and work lines of great lengths, especially when the plates are used in porous cells.

We prefer to use between stations an insulated connecting wire or cable of iron or galvanized iron or copper; but the circumstances which make such insulation necessary differ from those which necessitate an insulation in the case of existing telegraphs. The lines of these last conduct currents of electricity from batteries, and such intense currents will, by the contact of such line-wire with the moisture of the earth or water, tend to run back to the batteries producing them. In our arrangement the produced currents have a tendency to pass from the positive to the negative metal or substance through the earth or water, and the line-wire for the return-current completes the circuit, and the necessity of insulation exists, because where a line-wire is in contact for some distance with the earth or water it becomes, according to its positive or negative quality, an opposite metal to some of the metals or substances at the different stations which may be in contact with it, and thus the current which we require for telegraphic purposes would be expended and returned along the line-wire to the station where either of the three metals or substances (negative or positive to the substance of which the line-wire is composed) is in contact. Insulation of the line-wire—that is, protection from free electric contact with earth or water—therefore is required. For the above reasons it can be more readily made and maintained in our mode than under the system at present in use; but where a large portion of the wire becomes uninsulated by wear or other circumstances we can increase the surface of the metals or substances, and thus compensate for the loss or change of relation.

By our method the formation of a temporary magnet is effected or the condition of a permanent magnet altered at pleasure in the usual way.

Having now described the nature of our invention and in what manner the same is to be performed, what we claim, and desire to secure by Letters Patent, is—

The application to telegraphic instruments of currents of electricity produced from metals or substances arranged in the earth or in natural bodies of water, in the manner and of the properties and relations above described.

STANISLAS HOGA.
WILLIAM PETER PIGGOTT.
SEPTIMUS BEARDMORE.

Witnesses:
JOHN T. PITMAN,
T. P. CAPP.